United States Patent [19]

Wilford et al.

[11] Patent Number: 6,111,877
[45] Date of Patent: Aug. 29, 2000

[54] LOAD SHARING ACROSS FLOWS

[75] Inventors: Bruce A. Wilford, Los Altos; Thomas Dejanovic, Sunnyvale, both of Calif.

[73] Assignee: Cisco Technology, Inc., San Jose, Calif.

[21] Appl. No.: 09/002,210

[22] Filed: Dec. 31, 1997

[51] Int. Cl.[7] .............................. H04L 12/28; H04L 12/50
[52] U.S. Cl. .......................... 370/392; 370/238; 370/395
[58] Field of Search .................................... 370/389, 392, 370/394, 235, 238

[56] References Cited

U.S. PATENT DOCUMENTS

| | | |
|---|---|---|
| Re. 33,900 | 4/1992 | Howson . |
| 4,131,767 | 12/1978 | Weinstein . |
| 4,161,719 | 7/1979 | Parikh et al. . |
| 4,316,284 | 2/1982 | Howson . |
| 4,397,020 | 8/1983 | Howson . |
| 4,419,728 | 12/1983 | Larson . |
| 4,424,565 | 1/1984 | Larson . |
| 4,437,087 | 3/1984 | Petr . |
| 4,438,511 | 3/1984 | Baran . |
| 4,439,763 | 3/1984 | Limb . |
| 4,445,213 | 4/1984 | Baugh et al. . |
| 4,446,555 | 5/1984 | Devault et al. . |
| 4,456,957 | 6/1984 | Schieltz . |
| 4,464,658 | 8/1984 | Thelen . |
| 4,499,576 | 2/1985 | Fraser . |
| 4,506,358 | 3/1985 | Montgomery . |
| 4,507,760 | 3/1985 | Fraser . |
| 4,532,626 | 7/1985 | Flores et al. . |
| 4,644,532 | 2/1987 | George et al. . |
| 4,646,287 | 2/1987 | Larson et al. . |
| 4,677,423 | 6/1987 | Benvenuto et al. . |
| 4,679,189 | 7/1987 | Olson et al. ............................ 370/396 |
| 4,679,227 | 7/1987 | Hughes-Hartogs . |
| 4,713,806 | 12/1987 | Oberlander et al. ..................... 370/358 |

(List continued on next page.)

FOREIGN PATENT DOCUMENTS

| | | |
|---|---|---|
| 0 384 758 A2 | 8/1990 | European Pat. Off. . |
| 0 431 751 A1 | 6/1991 | European Pat. Off. . |
| 0 567 217 A2 | 10/1993 | European Pat. Off. . |
| WO93/07569 | 4/1993 | WIPO . |
| WO93/07692 | 4/1993 | WIPO . |
| WO94/01828 | 1/1994 | WIPO . |
| WO95/20850 | 8/1995 | WIPO . |

OTHER PUBLICATIONS

William Stallings, Data and Computer Communications, PP: 329–333, Prentice Hall, Upper Saddle River, New Jersey 07458.

Allen, M., "Novell IPX Over Various WAN Media (IPXW AN)," Network Working Group, RFC 1551, Dec. 1993, pp. 1–22.

Becker, D., "3c589.c: A 3c589 EtherLink3 ethernet driver for linux," becker@CESDIS.gsfc.nasa.gov, May 3, 1994, pp. 1–13.

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

*Primary Examiner*—Hassan Kizou
*Assistant Examiner*—Mitchell Slavitt
*Attorney, Agent, or Firm*—Swernofsky Law Group

[57] ABSTRACT

The invention provides a system and system for sharing packet traffic load among a plurality of possible paths. Each packet is associated with a flow, and a hash value is determined for each flow, so as to distribute the sequence of packets into a set of hash buckets. The hash value has a relatively large number of bits, but is divided by the number of possible paths so as to achieve a relatively small modulus value; the modulus value is used to index into a relatively small table associating one selected path with each entry. The modulus value is determined by a relatively small amount of circuitry, simultaneously for a plurality of moduli, and one such modulus value is selected in response to the number of possible paths.

26 Claims, 3 Drawing Sheets

U.S. PATENT DOCUMENTS

| | | |
|---|---|---|
| 4,723,267 | 2/1988 | Jones et al. . |
| 4,731,816 | 3/1988 | Hughes-Hartogs . |
| 4,750,136 | 6/1988 | Arpin et al. . |
| 4,757,495 | 7/1988 | Decker et al. . |
| 4,763,191 | 8/1988 | Gordon et al. . |
| 4,769,810 | 9/1988 | Eckberg, Jr. et al. . |
| 4,769,811 | 9/1988 | Eckberg, Jr. et al. . |
| 4,771,425 | 9/1988 | Baran et al. . |
| 4,819,228 | 4/1989 | Baran et al. . |
| 4,827,411 | 5/1989 | Arrowood et al. . |
| 4,833,706 | 5/1989 | Hughes-Hartogs . |
| 4,835,737 | 5/1989 | Herrig et al. . |
| 4,879,551 | 11/1989 | Georgiou et al. . |
| 4,893,306 | 1/1990 | Chao et al. . |
| 4,903,261 | 2/1990 | Baran et al. . |
| 4,905,233 | 2/1990 | Cain et al. ............................... 370/237 |
| 4,922,486 | 5/1990 | Lidinsky et al. . |
| 4,933,937 | 6/1990 | Konishi . |
| 4,960,310 | 10/1990 | Cushing . |
| 4,962,497 | 10/1990 | Ferenc et al. . |
| 4,962,532 | 10/1990 | Kasirai et al. . |
| 4,965,767 | 10/1990 | Kinoshita et al. . |
| 4,965,772 | 10/1990 | Daniel et al. . |
| 4,970,678 | 11/1990 | Sladowski et al. . |
| 4,979,118 | 12/1990 | Kheradpir ............................... 701/117 |
| 4,980,897 | 12/1990 | Decker et al. . |
| 4,991,169 | 2/1991 | Davis et al. . |
| 5,003,595 | 3/1991 | Collins et al. . |
| 5,014,265 | 5/1991 | Hahne et al. . |
| 5,020,058 | 5/1991 | Holden et al. . |
| 5,033,076 | 7/1991 | Jones et al. . |
| 5,034,919 | 7/1991 | Sassai et al. . |
| 5,054,034 | 10/1991 | Hughes-Hartogs . |
| 5,059,925 | 10/1991 | Weisbloom . |
| 5,072,449 | 12/1991 | Enns et al. . |
| 5,088,032 | 2/1992 | Bosack . |
| 5,095,480 | 3/1992 | Fenner ................................... 370/238 |
| 5,115,431 | 5/1992 | Williams et al. . |
| 5,128,945 | 7/1992 | Enns et al. . |
| 5,136,580 | 8/1992 | Videlock et al. . |
| 5,166,930 | 11/1992 | Braff et al. . |
| 5,199,049 | 3/1993 | Wilson . |
| 5,206,886 | 4/1993 | Bingham . |
| 5,208,811 | 5/1993 | Kashio et al. . |
| 5,212,686 | 5/1993 | Joy et al. . |
| 5,224,099 | 6/1993 | Corbalis et al. . |
| 5,226,120 | 7/1993 | Brown et al. . |
| 5,228,062 | 7/1993 | Bingham . |
| 5,229,994 | 7/1993 | Balzano et al. . |
| 5,237,564 | 8/1993 | Lespagnol et al. . |
| 5,241,682 | 8/1993 | Bryant et al. . |
| 5,243,342 | 9/1993 | Kattemalalavadi et al. . |
| 5,243,596 | 9/1993 | Port et al. . |
| 5,247,516 | 9/1993 | Bernstein et al. . |
| 5,249,178 | 9/1993 | Kurano et al. . |
| 5,253,251 | 10/1993 | Aramaki . |
| 5,255,291 | 10/1993 | Holden et al. . |
| 5,260,933 | 11/1993 | Rouse . |
| 5,260,978 | 11/1993 | Fleischer et al. . |
| 5,268,592 | 12/1993 | Bellamy et al. . |
| 5,268,900 | 12/1993 | Hluchyj et al. . |
| 5,271,004 | 12/1993 | Proctor et al. . |
| 5,274,631 | 12/1993 | Bhardwaj . |
| 5,274,635 | 12/1993 | Rahman et al. . |
| 5,274,643 | 12/1993 | Fisk . |
| 5,280,470 | 1/1994 | Buhrke et al. . |
| 5,280,480 | 1/1994 | Pitt et al. . |
| 5,280,500 | 1/1994 | Mazzola et al. . |
| 5,283,783 | 2/1994 | Nguyen et al. . |
| 5,287,103 | 2/1994 | Kasprzyk et al. . |
| 5,287,453 | 2/1994 | Roberts ................................... 709/201 |
| 5,291,482 | 3/1994 | McHarg et al. . |
| 5,305,311 | 4/1994 | Lyles . |
| 5,307,343 | 4/1994 | Bostica et al. . |
| 5,309,437 | 5/1994 | Perlman et al. ......................... 370/401 |
| 5,311,509 | 5/1994 | Heddes et al. . |
| 5,313,454 | 5/1994 | Bustini et al. . |
| 5,313,582 | 5/1994 | Hendel et al. . |
| 5,317,562 | 5/1994 | Nardin et al. . |
| 5,319,644 | 6/1994 | Liang . |
| 5,327,421 | 7/1994 | Hiller et al. . |
| 5,331,637 | 7/1994 | Francis et al. . |
| 5,345,445 | 9/1994 | Hiller et al. . |
| 5,345,446 | 9/1994 | Hiller et al. . |
| 5,359,592 | 10/1994 | Corbalis et al. . |
| 5,361,250 | 11/1994 | Nguyen et al. . |
| 5,361,256 | 11/1994 | Doeringer et al. . |
| 5,361,259 | 11/1994 | Hunt et al. . |
| 5,365,524 | 11/1994 | Hiller et al. . |
| 5,367,517 | 11/1994 | Cidon et al. . |
| 5,371,852 | 12/1994 | Attanasio et al. . |
| 5,386,567 | 1/1995 | Lien et al. . |
| 5,390,170 | 2/1995 | Sawant et al. . |
| 5,390,175 | 2/1995 | Hiller et al. . |
| 5,394,394 | 2/1995 | Crowther et al. . |
| 5,394,402 | 2/1995 | Ross . |
| 5,400,325 | 3/1995 | Chatwani et al. . |
| 5,408,469 | 4/1995 | Opher et al. . |
| 5,416,842 | 5/1995 | Aziz . |
| 5,422,880 | 6/1995 | Heitkamp et al. . |
| 5,422,882 | 6/1995 | Hiller et al. . |
| 5,423,002 | 6/1995 | Hart . |
| 5,426,636 | 6/1995 | Hiller et al. . |
| 5,428,607 | 6/1995 | Hiller et al. . |
| 5,430,715 | 7/1995 | Corbalis et al. . |
| 5,430,729 | 7/1995 | Rahnema . |
| 5,442,457 | 8/1995 | Najafi . |
| 5,442,630 | 8/1995 | Gagliardi et al. . |
| 5,452,297 | 9/1995 | Hiller et al. . |
| 5,473,599 | 12/1995 | Li et al. . |
| 5,473,607 | 12/1995 | Hausman et al. . |
| 5,477,541 | 12/1995 | White et al. . |
| 5,485,455 | 1/1996 | Dobbins et al. . |
| 5,490,140 | 2/1996 | Abensour et al. . |
| 5,490,258 | 2/1996 | Fenner ................................... 711/1 |
| 5,491,687 | 2/1996 | Christensen et al. . |
| 5,491,804 | 2/1996 | Heath et al. . |
| 5,497,368 | 3/1996 | Reijnierse et al. . |
| 5,504,747 | 4/1996 | Sweasey . |
| 5,509,006 | 4/1996 | Wilford et al. . |
| 5,517,494 | 5/1996 | Green . |
| 5,519,704 | 5/1996 | Farinacci et al. . |
| 5,519,858 | 5/1996 | Walton et al. ........................... 707/10 |
| 5,526,489 | 6/1996 | Nilakantan et al. . |
| 5,530,963 | 6/1996 | Moore et al. . |
| 5,535,195 | 7/1996 | Lee . |
| 5,539,734 | 7/1996 | Burwell et al. . |
| 5,541,911 | 7/1996 | Nilakantan et al. . |
| 5,546,370 | 8/1996 | Ishikawa . |
| 5,555,244 | 9/1996 | Gupta et al. . |
| 5,561,669 | 10/1996 | Lenney et al. . |
| 5,583,862 | 12/1996 | Callon . |
| 5,592,470 | 1/1997 | Rudrapatna et al. . |
| 5,598,581 | 1/1997 | Daines et al. . |
| 5,600,798 | 2/1997 | Cherukuri et al. . |
| 5,602,770 | 2/1997 | Ohira . |
| 5,604,868 | 2/1997 | Komine et al. . |
| 5,608,726 | 3/1997 | Virgile . |
| 5,617,417 | 4/1997 | Sathe et al. . |
| 5,617,421 | 4/1997 | Chin et al. . |
| 5,630,125 | 5/1997 | Zellweger ............................... 707/103 |
| 5,631,908 | 5/1997 | Saxe . |

| | | |
|---|---|---|
| 5,632,021 | 5/1997 | Jennings et al. . |
| 5,634,010 | 5/1997 | Ciscon et al. . |
| 5,638,359 | 6/1997 | Peltola et al. . |
| 5,644,718 | 7/1997 | Belove et al. . |
| 5,659,684 | 8/1997 | Giovannoni et al. . |
| 5,666,353 | 9/1997 | Klausmeier et al. . |
| 5,673,265 | 9/1997 | Gupta et al. . |
| 5,678,006 | 10/1997 | Valizadeh et al. . |
| 5,680,116 | 10/1997 | Hashimoto et al. . |
| 5,684,797 | 11/1997 | Aznar et al. ............ 370/390 |
| 5,687,324 | 11/1997 | Green et al. . |
| 5,689,506 | 11/1997 | Chiussi et al. ............ 370/388 |
| 5,694,390 | 12/1997 | Yamato et al. . |
| 5,724,351 | 3/1998 | Chao et al. . |
| 5,740,097 | 4/1998 | Satche . |
| 5,748,186 | 5/1998 | Raman ............ 345/302 |
| 5,748,617 | 5/1998 | McLain, Jr. . |
| 5,754,547 | 5/1998 | Nakazawa . |
| 5,802,054 | 9/1998 | Bellenger . |
| 5,835,710 | 11/1998 | Nagami et al. . |
| 5,841,874 | 11/1998 | Kempke et al. . |
| 5,854,903 | 12/1998 | Morrison et al. . |
| 5,856,981 | 1/1999 | Voelker . |
| 5,892,924 | 4/1999 | Lyon et al. ............ 709/245 |
| 5,898,686 | 4/1999 | Virgile . |
| 5,903,559 | 5/1999 | Acharya et al. . |
| 5,914,953 | 6/1999 | Krause et al. ............ 370/392 |
| 6,011,780 | 1/2000 | Vaman et al. ............ 370/237 |

OTHER PUBLICATIONS

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point-to-Point Protocol," Network Working Group, RFC 1547, Dec. 1993, pp. 1–19.

Simpson, W., "The Point-to-Point Protocol (PPP)," Network Working Group, RFC 1548, Dec. 1993, pp. 1–53.

Tsuchiya, P.F., "A Search Algorithm for Table Entries with Non-Contiguous Wildcarding," Abstract, Bellcore.

Zhang, et al., "Rate-Controlled Static-Priority Queueing," INFOCOM 1993, pp. 227–236.

LOAD SHARING ACROSS FLOWS

BACKGROUND OF THE INVENTION

1. Field of the Invention

This invention relates to network routing.

2. Related Art

In routing packets in a network, a router sometimes has a choice of more than one path to a selected destination. When there is more than one path, there is a possibility that the router can distribute packet traffic among the paths, so as to reduce the aggregate packet traffic load on any one individual path. This concept is known in the art of network routing as "load sharing."

One problem that has arisen in the art is that sharing packet traffic among more than one such path can result in out-of-order arrival of packets at the destination device (or at an intermediate device on both paths to the destination device). Out-of-order arrival of packets is generally undesirable, as some protocols rely on packets arriving in the order they were sent.

Accordingly, it would be desirable to share packet traffic load among more than one such path, while maintaining the order in which the packets were sent in all cases where order matters. The invention provides load-sharing that is preferably performed on a per-flow basis, but possibly on a per-packet basis. A "flow" is a sequence of packets transmitted between a selected source and a selected destination, generally representing a single session using a known protocol. Each packet in a flow is expected to have identical routing and access control characteristics.

Flows are further described in detail in the following patent applications:

U.S. application Ser. No. 08/581,134, titled "Method For Traffic Management, Traffic Prioritization, Access Control, and Packet Forwarding in a Datagram Computer Network", filed Dec. 29, 1995, in the name of inventors David R. Cheriton and Andreas V. Bechtolsheim, assigned to Cisco Technology, Inc., attorney docket number CIS-019;

U.S. application Ser. No. 08/655,429, titled "Network Flow Switching and Flow Data Export", filed May 28, 1996, in the name of inventors Darren Kerr and Barry Bruins, and assigned to Cisco Technology, Inc., attorney docket number CIS-016; and U.S. application Ser. No. 08/771,438, titled "Network Flow Switching and Flow Data Export", filed Dec. 20, 1996, in the name of inventors Darren Kerr and Barry Bruins, assigned to Cisco Technology, Inc., attorney docket number CIS-017.

PCT International Application PCT/US 96/20205, titled "Method For Traffic Management, Traffic Prioritization, Access Control, and Packet Forwarding in a Datagram Computer Network", filed Dec. 18, 1996, in the name of inventors David R. Cheriton and Andreas V. Bechtolsheim, and assigned to Cisco Technology, Inc., attorney docket number CIS-019 PCT; and U.S. application Ser. No. 08/655,429, Express Mail Mailing No. EM053698725US, titled "Network Flow Switching and Flow Data Export", filed Jul. 2, 1997, in the name of inventors Darren Kerr and Barry Bruins, assigned to Cisco Technology, Inc.

These patent applications are collectively referred to herein as the "Netflow Switching Disclosures." Each of these applications is hereby incorporated by reference as if fully set forth herein.

However, one problem with sharing packet traffic load among more than one such path, whether on a per-packet basis or on a per-flow basis, is that the number of packets or the number of flows may not be evenly divisible by the number of such paths. In fact, with the number of packets or the number of flows continually changing, it would be difficult at best to maintain an even distribution of packets or flows into the number of such paths.

One response to this problem is to provide a hash function, to pseudo-randomly assign each packet or each flow to a hash value, and to share the packet traffic load among the paths in response to the hash value (such as by associating each hash table entry with a selected path). While this technique achieves the purpose of sharing the packet traffic load among more than one path to the destination, it has the drawback that packet traffic load is typically not evenly divided, particularly when the number of such paths is not a power of two.

For example, if there are three bits of hash value, thus providing eight possible hash values in all, but there are only five paths to the destination (or the weighted sum of desirable path loads is a multiple of five), the first five hash values would be evenly distributed among the paths, but the remaining three hash values would be unevenly distributed to three of the five possible paths.

One response to this problem is to select a hash value with more bits, and thus with more possible values, so as to more evenly distribute packets or flows among the possible paths. While this method achieves the purpose of evenly distributing packet traffic load, it has the drawback of requiring a relatively large amount of memory for the associated hash table, an amount of memory which is relatively larger as the amount of desired load imbalance is reduced.

Accordingly, it would be advantageous to provide a method and system in which packet traffic can be relatively evenly divided among a plurality of possible paths, without requiring a relatively large amount of memory. This advantage is achieved in an embodiment of the invention which provides a hash value with a relatively large number of bits, but which provides for processing that hash value using the number of possible paths so as to associate that hash value with a selected path using a table having a relatively small number of entries. The processing can be performed rapidly in hardware using a relatively small amount of circuitry.

SUMMARY OF THE INVENTION

The invention provides a method and system for sharing packet traffic load among a plurality of possible paths. Each packet is associated with a flow, and a hash value is determined for each flow, so as to distribute the sequence of packets into a set of hash buckets. The hash value has a relatively large number of bits, but is divided by the number of possible paths so as to achieve a relatively small modulus value; the modulus value is used to index into a relatively small table associating one selected path with each entry.

In a preferred embodiment, the modulus value is determined by a relatively small amount of circuitry, simultaneously for a plurality of modulii, and one such modulus value is selected in response to the number of possible paths.

load-sharing table 130, responsive to the information from the information source 110.

Table 1-1 shows a load-sharing error function, responsive to a number of paths to be load-shared and a number of entries in a pseudo-random distribution function.

TABLE 1-1

Error Function for Load Sharing Using Pseudo-Random Distribution Function
(* = Less Than 0.05%)

| | | Number of Paths for Load-Sharing | | | | | | | | | | | | |
|---|---|---|---|---|---|---|---|---|---|---|---|---|---|---|
| | 3 | 4 | 5 | 6 | 7 | 8 | 9 | 10 | 11 | 12 | 13 | 14 | 15 | 16 |
| 4 | 16.7 | 0 | | | | | | | | | | | | |
| 8 | 8.3 | 0 | 15.0 | 16.7 | 10.7 | 0 | | | | | | | | |
| 16 | 4.2 | 0 | 5.0 | 8.3 | 8.9 | 0 | 9.7 | 15.0 | 17.0 | 16.7 | 14.4 | 10.7 | 5.8 | 0 |
| 32 | 2.1 | 0 | 3.8 | 4.2 | 5.4 | 0 | 6.9 | 5.0 | 2.8 | 8.3 | 10.1 | 8.9 | 5.4 | 0 |
| 64 | 1.0 | 0 | 1.2 | 2.1 | 1.3 | 0 | 1.4 | 3.8 | 2.6 | 4.2 | 1.4 | 5.4 | 4.6 | 0 |
| 128 | .5 | 0 | .9 | 1.0 | 1.1 | 0 | 1.2 | 1.2 | 2.0 | 2.1 | 1.3 | 1.3 | 2.9 | 0 |
| 256 | .3 | 0 | .3 | .5 | .7 | 0 | .9 | .9 | .9 | 1.0 | 1.1 | 1.1 | .4 | 0 |
| 512 | .1 | 0 | .2 | .3 | .2 | 0 | .2 | .3 | .5 | .5 | .6 | .7 | .3 | 0 |
| 1024 | .1 | 0 | .1 | .1 | .1 | 0 | .2 | .2 | .1 | .3 | .2 | .2 | .3 | 0 |
| 2048 | * | 0 | .1 | .1 | .1 | 0 | .1 | .1 | .1 | .1 | .2 | .1 | .2 | 0 |
| 4096 | * | 0 | * | * | * | 0 | * | .1 | .1 | .1 | * | .1 | * | 0 |
| 8192 | * | 0 | * | * | * | 0 | * | * | * | * | * | * | * | 0 |
| 16384 | * | 0 | * | * | * | 0 | * | * | * | * | * | * | * | 0 |
| 32768 | * | 0 | * | * | * | 0 | * | * | * | * | * | * | * | 0 |
| 65536 | * | 0 | * | * | * | 0 | * | * | * | * | * | * | * | 0 |

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using circuits adapted to particular process steps and data structures described herein, and that implementation of the process steps and data structures described herein would not require undue experimentation or further invention.

Load-Sharing System Elements

Figure 1:
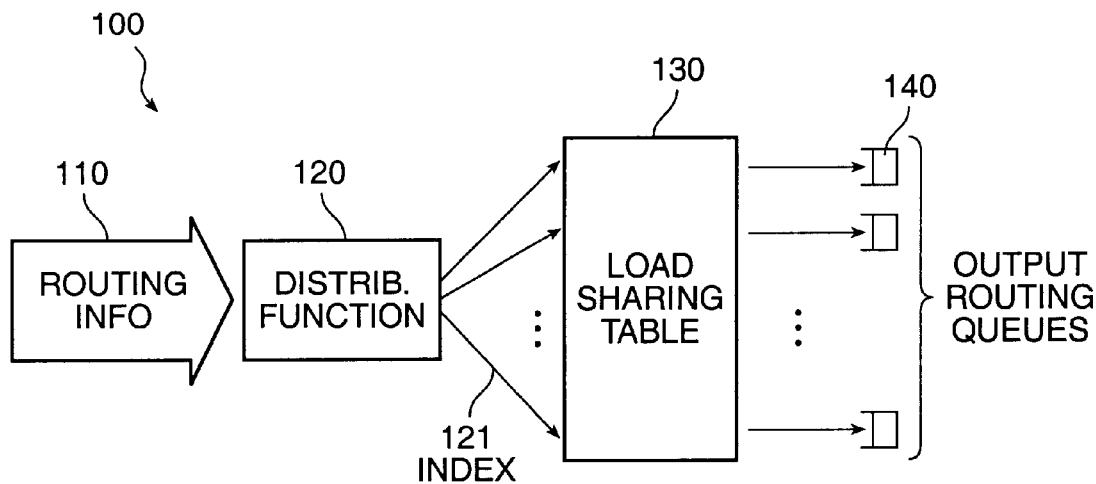
FIG. 1 shows a block diagram of a system for sharing packet traffic load among a plurality of possible paths.

FIG. 1 shows a block diagram of a system for sharing packet traffic load among a plurality of possible paths.

A system 100 for sharing packet traffic load includes a packet routing information source 110, a distribution function generator 120, a load-sharing table 130, and a set of output routing queues 140.

The packet routing information source 110 provides a set of routing information for an associated packet, to cause packets to be distributed for load-sharing in response to that routing information about the packet.

In a preferred embodiment, the routing information is responsive to a flow to which the associated packet belongs. Determining the flow to which a packet belongs is further described in the Netflow Switching Disclosures, hereby incorporated by reference. One problem with load-sharing is that some load-shared routes are relatively quicker or relatively slower than others, with the possible result that packets may arrive at their destinations out of the order in which they arrived at the router. Providing load-sharing responsive to the flow to which the packet belongs has the advantage that there is no negative consequence for packets to arrive out of order, because packet order is preserved within each flow.

The distribution function generator 120 is coupled to the information source 110, and provides an index 121 into the Table 1-1 cross-indexes the number of entries in the load-sharing table 130 against the number of output routing queues 140.

Because the number of output routing queues 140 does not exceed the number of entries in the load-sharing table 130, some entries in the upper right of table 1-1 are blank.

Numeric entries in table 1-1 show the fraction of traffic that is sent to the "wrong" output routing queue 140. For example, in the case there are eight entries in the load-sharing table 130 and five output routing queues 140, each of the first three output routing queues 140 receives 25% (2/8), rather than 20% (1/5), of outgoing traffic. Each such output routing queue 140 is therefore 5% overused, for a total of 15%. This value is shown as the error function in table 1-1.

Table 1-1 shows that only about 4096 ($2^{12}$) entries in the load-sharing table 130 are needed to reduce the error function to 0.1% or less for all cases for number of output routing queues 140. Accordingly, in a preferred embodiment, the distribution function generator 120 provides about 12 bits of pseudo-random output.

In a preferred embodiment, the distribution function generator 120 includes a hash function that provides 12 bits of pseudo-random output.

Because there are no more than about 16 output routing queues 140, the index 121 can be about no more than four bits. Accordingly, in a preferred embodiment, the distribution function generator 120 includes a modulus element responsive to the hash function that provides three or four bits of output as the index 121.

The load-sharing table 130 is coupled to the index 121, and provides a pointer 131 to one of the output routing queues 140, responsive to the index 121.

Four-Bit Index Values

Figure 2A:
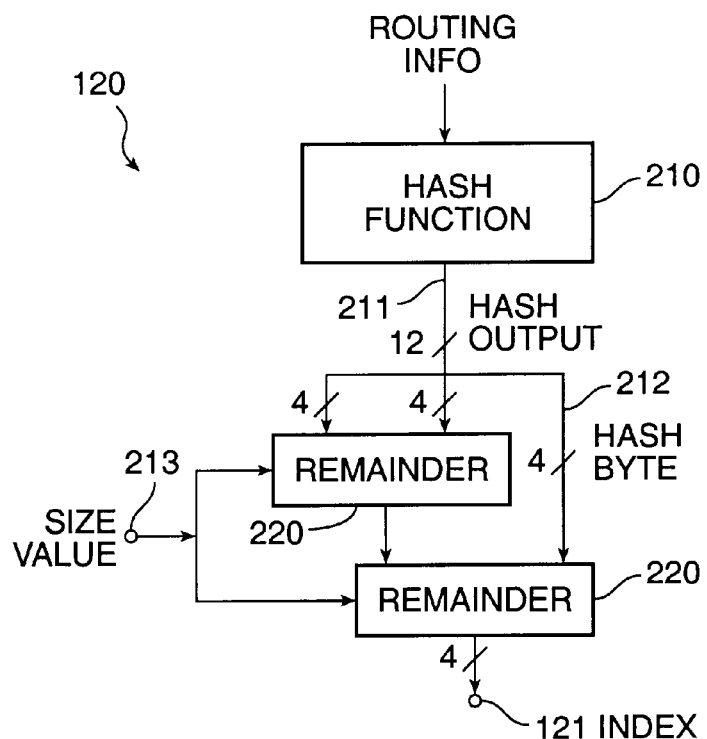
FIG. 2A shows a block diagram of a first distribution function for sharing packet traffic load.
Figure 2B:
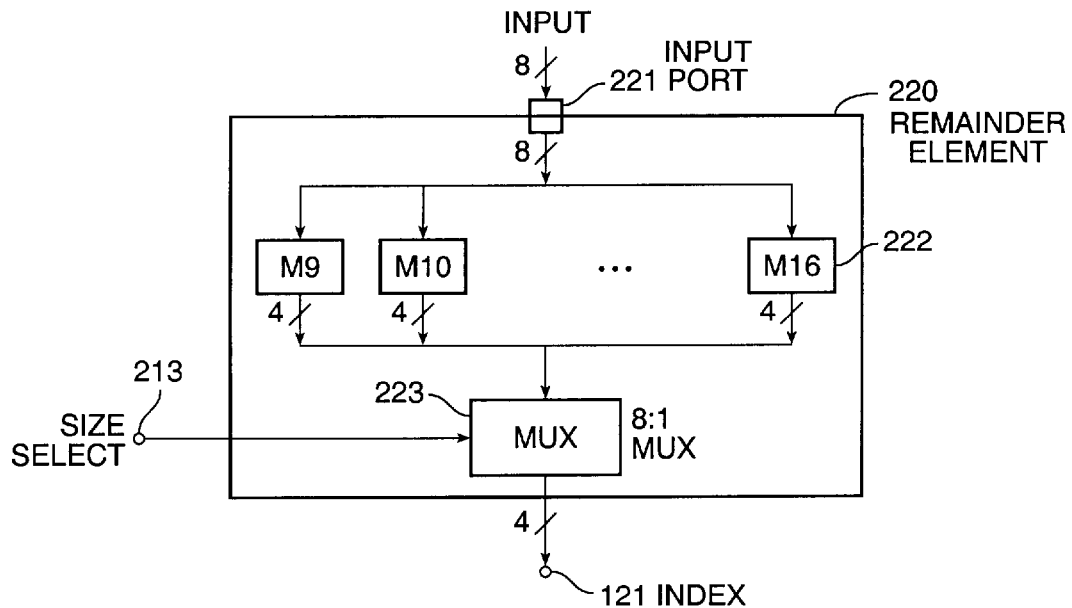
FIG. 2B shows a block diagram of a computing element for the first distribution function.

FIG. 2A shows a block diagram of a first distribution function generator 120 for sharing packet traffic load. FIG. 2B shows a block diagram of a computing element for the first distribution function generator 120.

In a first preferred embodiment, the distribution function generator 120 includes a hash function 210 that provides a 12-bit hash function output value 211. The hash function output value includes three 4-bit bytes 212, which are coupled to a plurality of remainder elements 220 as shown in FIG. 2A.

At a first stage of the distribution function generator 120, a most significant byte 212 and a second-most significant byte 212 of the output value 211 are coupled to eight input bits of a first remainder element 220. A size value 213 is also coupled as a selector input to the first remainder element 220, for selecting the divisor for which the remainder is calculated.

At a second stage of the distribution function generator 120, an output byte 212 from the first remainder element 220 and a least significant byte 212 of the output value 211 are coupled to eight input bits of a second remainder element 220. The size value 213 is also coupled as the divisor selector input to the second remainder element 220.

The index 121 is output from the second remainder element 220.

The remainder element 220 includes an input port 221, a plurality of remainder circuits 222, and a multiplexer 223.

The input port 221 is coupled to the 8-bit input for the remainder element 220.

The plurality of remainder circuits 222 includes one remainder circuit 222 for each possible divisor. In this first preferred embodiment where the hash function output value includes three 4-bit bytes 212, there are eight possible divisors from nine to 16. Divisors less than nine are emulated by doubling the divisor until it falls within the range nine to 16. Each remainder circuit 222 computes and outputs a remainder after division by its particular divisor.

The multiplexer 223 selects one of the outputs from the plurality of remainder circuits 222, responsive to the size value 213 input to the remainder element 220, and outputs its selection as the index 121.

Table 2-1 shows a set of measured size and speed values for synthesized logic for computing the modulus function for 4-bit index values.

These values were obtained by synthesizing logic for each remainder element 222 using the "G10P Cell-Based ASIC" product, available from LSI Logic of Milpitas, Calif.

TABLE 2-1

Size and Speed for Synthesized Modulus Function Logic

| Function | Time in Nanoseconds | Number of Gates |
| --- | --- | --- |
| mod 9 | 2.42 | 126 |
| mod 10 | 2.27 | 73 |
| mod 11 | 2.44 | 159 |
| mod 12 | 1.04 | 45 |
| mod 13 | 2.50 | 191 |
| mod 14 | 2.28 | 92 |
| mod 15 | 1.42 | 82 |
| mod 16 | .16 | 5 |

As shown in table 2-1, the time in nanoseconds and the number of gates for each remainder circuit 222 is quite small.

Three-Bit Index Values

Figure 3A:
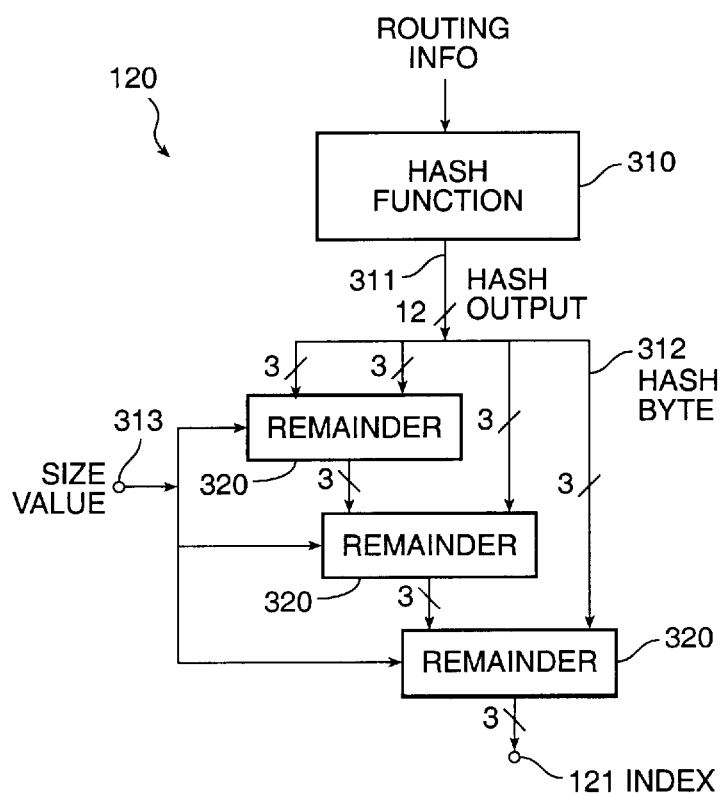
FIG. 3A shows a block diagram of a second distribution function for sharing packet traffic load.
Figure 3B:
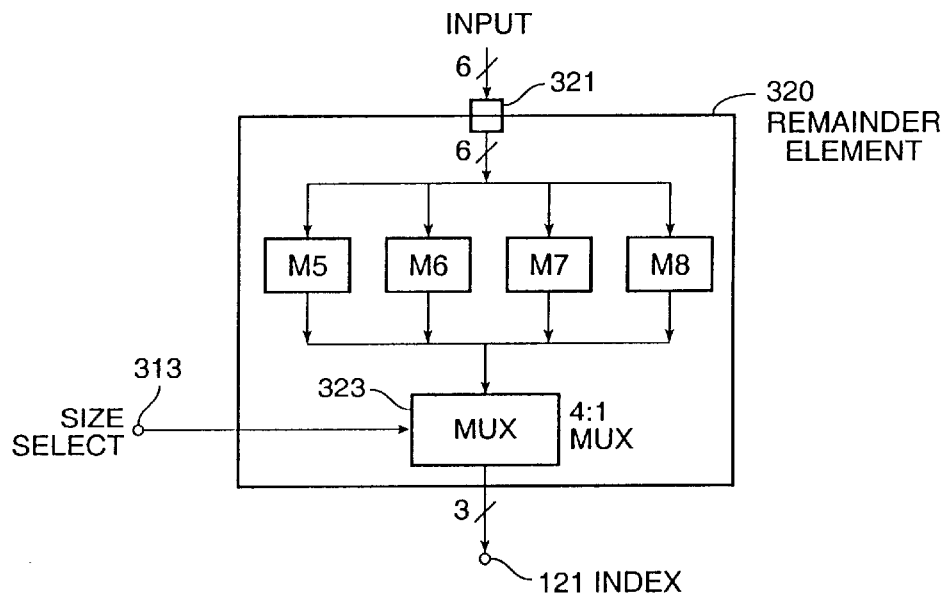
FIG. 3B shows a block diagram of a computing element for the second distribution function.

FIG. 3A shows a block diagram of a second distribution function for sharing packet traffic load. FIG. 3B shows a block diagram of a computing element for the second distribution function.

In a second preferred embodiment, the distribution function generator 120 includes a hash function 310 that provides a 12-bit hash function output value 311. The hash function output value includes four 3-bit bytes 312, which are coupled to a plurality of remainder elements 320 as shown in FIG. 3A.

At a first stage of the distribution function generator 120, a most significant byte 312 and a second-most significant byte 312 of the output value 311 are coupled to six input bits of a first remainder element 320. A size value 313 is also coupled as a divisor input to the first remainder element 320.

At a second stage of the distribution function generator 120, an output byte 312 from the first remainder element 320 and a next-most significant byte 312 of the output value 311 are coupled to six input bits of a second remainder element 320. The size value 313 is also coupled as the divisor input to the second remainder element 320.

At a third stage of the distribution function generator 120, an output byte 312 from the second remainder element 320 and a least significant byte 312 of the output value 311 are coupled to six input bits of a third remainder element 320. The size value 313 is also coupled as the divisor input to the third remainder element 320.

The index 121 is output from the third remainder element 320.

Similar to the remainder element 220, the remainder element 320 includes an input port 321, a plurality of remainder circuits 322, and a multiplexer 323.

Similar to the input port 221, the input port 321 is coupled to the 6-bit input for the remainder element 320.

Similar to the plurality of remainder circuits 222, the plurality of remainder circuits 322 includes one remainder circuit 322 for each possible divisor. In this second preferred embodiment where the hash function output value includes four 3-bit bytes 312, there are four possible divisors from five to eight. Divisors less than five are emulated by doubling the divisor until it falls within the range five to eight. Each remainder circuit 322 computes and outputs a remainder after division by its particular divisor.

Similar to the multiplexer 223, the multiplexer 323 selects one of the outputs from the plurality of remainder circuits 322, responsive to the size value 313 input to the remainder element 320, and outputs its selection as the index 121.

Table 3-1 shows a set of measured size and speed values for synthesized logic for computing the modulus function for 3-bit index values.

Similar to table 2-1, these values were obtained by synthesizing logic for each remainder element 322 using the "G10P Cell-Based ASIC" product, available from LSI Logic of Milpitas, Calif.

TABLE 3-1

Size and Speed for Synthesized Modulus Function Logic

| Function | Time in Nanoseconds | Number of Gates |
| --- | --- | --- |
| mod 5 | 1.99 | 57 |
| mod 6 | 1.52 | 31 |
| mod 7 | 1.10 | 50 |
| mod 8 | .16 | 4 |

As shown in table 3-1, the time in nanoseconds and the number of gates for each remainder circuit 322 is quite small.

Software Implementation

In a software implementation, in place of each remainder element 222 or remainder element 322, a processor performs a lookup into a modulus table having the modulus values resulting from the appropriate division. For example, to compute the modulus value for the remainder element 322 for division by six, the modulus table would have the values 0, 1, 2, 3, 4, and 5, repeated as many times as necessary to completely fill the table.

Non-Equal-Cost Paths

When different data paths have unequal associated costs, some data paths can be associated with more than one entry in the load-sharing table 130. Each entry in the load-sharing table 130 can therefore be assigned an equivalent amount of load. For example, if three output data paths are OC-12 links, while one output data path is an OC-48 link, the OC-48 data path can be assigned four entries in the load-sharing table 130 because it has four times the capacity of the OC-12 data paths. Therefore, in this example, there would be seven entries in the load-sharing table 130 for just four different output data paths.

Modulus Element Using Free-Running Counter

Figure 4:
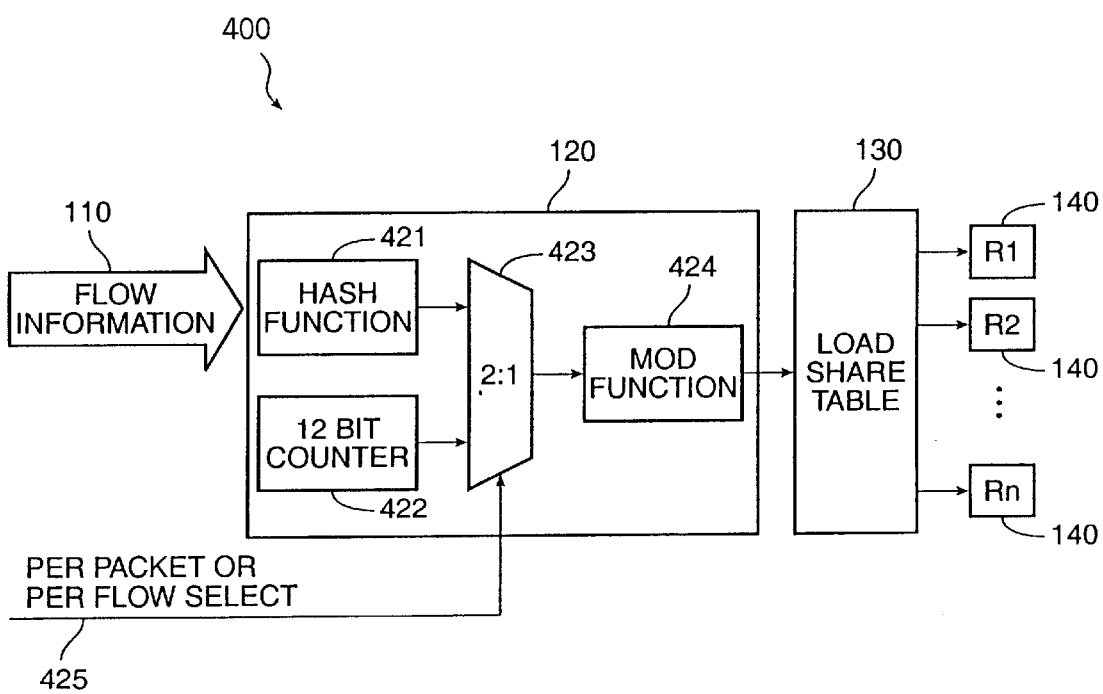
FIG. 4 shows a block diagram of a computing element for the modulus part of the first or second distribution function.

FIG. 4 shows a block diagram of an alternative embodiment of a system for sharing packet traffic load among a plurality of possible paths.

A system 400 includes a packet routing information source 110, a distribution function generator 120, a load-sharing table 130, and a set of output routing queues 140. The distribution function generator 120 includes a hash function element 421, a free-running counter 422, a flow/packet multiplexer 423, and a modulus function element 424.

The flow/packet multiplexer 423 is coupled to a flow/packet select input 425 for selecting whether load-sharing is performed per-flow or per-packet. One of two operations is performed:

- If the flow/packet select input 425 indicates load-sharing is performed per-flow, the flow/packet multiplexer 423 selects the output of the hash function element 421, and the modulus function element 424 distributes packets to the load-sharing table 130, and ultimately to the output routing queues 140, responsive to what flow the packet is associated with. Thus, all packets in the same flow are distributed to the same output routing queue 140.
- If the flow/packet select input 425 indicates load-sharing is performed per-packet, the flow/packet multiplexer 423 selects the output of the free-running counter 422, and the modulus function element 424 distributes packets to the load-sharing table 130, and ultimately to the output routing queues 140, responsive to the raw order in which packets arrive. Thus, packets are effectively distributed uniformly in a round-robin manner among the possible output routing queues 140.

In a preferred embodiment, the free running counter 422 produces a 12-bit unsigned integer output, and recycles back to zero when the maximum value is reached.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method for distributing a sequence of packets among a number N of data paths, said method including steps for
    for each packet in said sequence, associating a distribution value therewith, said distribution value having a number of possible values well in excess of said number N;
    for each said distribution value, determining a modulus of said distribution value with regard to said number N; and
    sharing packet traffic load among a plurality of outgoing data paths in response to said modulus.

2. A method as in claim 1, including steps for partitioning said sequence of packets into a plurality of flows; wherein said steps for associating include steps for associating a single distribution value for substantially all packets in one of said flows.

3. A method as in claim 1, wherein said distribution value for each said packet is responsive to an address for a sender for said packet and an address for a destination for said packet.

4. A method as in claim 1, wherein said distribution value for each said packet is responsive to a port for a sender for said packet and a port for a destination for said packet.

5. A method as in claim 1, wherein said distribution value for each said packet is responsive to a protocol type for said packet.

6. A method as in claim 1, wherein said distribution value includes a hash function value.

7. A method as in claim 1, wherein said distribution value includes a pseudo-random value.

8. A method as in claim 1, wherein said distribution value includes at least twice as many bits as needed to enumerate said number N.

9. A method as in claim 1, wherein said steps for determining a modulus include steps for
    determining a first modulus of a first portion of said distribution value;
    determining a second modulus of a combination of said first modulus and a second portion of said distribution value.

10. A method as in claim 1, wherein said steps for determining a modulus include steps for
    determining a first modulus of said distribution value with regard to a first divisor;
    determining a second modulus of said distribution value with regard to a second divisor; and
    selecting between said first modulus and said second modulus in response to said number N.

11. A method as in claim 1, wherein said steps for determining a modulus include steps for
    simultaneously determining a plurality of modulus values for said distribution value; and
    selecting among said plurality of modulus values in response to said number N.

12. A method as in claim 1, wherein said steps for sharing packet traffic load include steps for indexing into a table in response to said modulus.

13. A method as in claim 1, wherein said steps for sharing packet traffic load include steps for indexing into a table in response to said modulus, said table having fewer entries than twice said number N.

14. A system for distributing a sequence of packets among a number N of data paths, said system including
    a distribution value element coupled to each packet in said sequence, an output of said distribution value element having a number of possible values well in excess of said number N;
    a modulus element coupled to said distribution value element; and
    a load-sharing element responsive to an output of said modulus element.

15. A system as in claim 14, wherein
    said sequence of packets forms a plurality of flows; and
    said distribution value element is operative to assign a single distribution value for substantially all packets in one of said flows.

16. A system as in claim 14, wherein said distribution value element is responsive to an address for a sender for each said packet and an address for a destination for each said packet.

17. A system as in claim 14, wherein said distribution value element is responsive to a port for a sender for each said packet and a port for a destination for each said packet.

18. A system as in claim 14, wherein said distribution value element is responsive to a protocol type for each said packet.

19. A system as in claim 14, wherein said distribution value element includes a hash function.

20. A system as in claim 14, wherein said distribution value element includes a uniform distribution element.

21. A system as in claim 14, wherein an output of said distribution value element includes at least twice as many bits as needed to enumerate said number N.

22. A system as in claim 14, wherein said modulus element includes a first modulus element coupled to a first portion of said distribution value;

a second modulus element coupled an output of said first modulus element and to a second portion of said distribution value.

23. A system as in claim 14, wherein said modulus element includes a first modulus element coupled to said distribution value and to a first divisor;

a second modulus element coupled to said distribution value and to a second divisor; and a selector coupled to said first modulus element and to said second modulus element.

24. A system as in claim 14, wherein modulus element includes a plurality of modulus elements each coupled to said distribution value; and a selector coupled to said plurality of modulus elements and to said number N.

25. A system as in claim 14, wherein said load-sharing element includes an indexed table.

26. A system as in claim 14, wherein said load-sharing element includes an indexed table, said table having fewer entries than twice said number N.

* * * * *